United States Patent [19]

Herbold et al.

[11] 4,084,521

[45] Apr. 18, 1978

[54] METHOD AND APPARATUS FOR THE PYROLYSIS OF WASTE PRODUCTS

[75] Inventors: Oskar Herbold, Meckesheim; Dieter Dittloff, Sinsheim, both of Germany

[73] Assignee: Helma Lampl, Sinsheim-Rohrbach, Germany

[21] Appl. No.: 625,311

[22] Filed: Oct. 23, 1975

[30] Foreign Application Priority Data

May 9, 1975 Germany ............................ 2520754

[51] Int. Cl.² ........................... F23G 5/02; F23G 5/12
[52] U.S. Cl. .................................. 110/242; 110/342; 201/35; 202/118; 110/346
[58] Field of Search ........................... 110/11, 8 P, 14; 202/110, 135, 136, 216, 218, 118; 201/35

[56] References Cited

U.S. PATENT DOCUMENTS

| | | | |
|---|---|---|---|
| 3,362,887 | 1/1968 | Rodgers | 110/11 |
| 3,376,202 | 4/1968 | Mesher | 202/110 |
| 3,768,424 | 10/1973 | Hage | 110/11 |
| 3,774,555 | 11/1973 | Turner | 110/11 |
| 3,777,676 | 12/1973 | Lagen | 110/11 |
| 3,785,306 | 1/1974 | Jaget | 110/11 |
| 3,794,565 | 2/1974 | Bielski et al. | 202/131 |
| 3,843,457 | 10/1974 | Grannen et al. | 201/35 |

*Primary Examiner*—Kenneth W. Sprague
*Attorney, Agent, or Firm*—Anthony J. Casella

[57] ABSTRACT

Apparatus and method for the pyrolysis of waste material such as old tyres in which cuttings of the waste material are fed to a reactor vessel and heated under sub-atmospheric pressure by an outside heat source, the decomposition products being given off mainly in the form of gases. Some of the gas is burnt to provide the heat.

20 Claims, 1 Drawing Figure

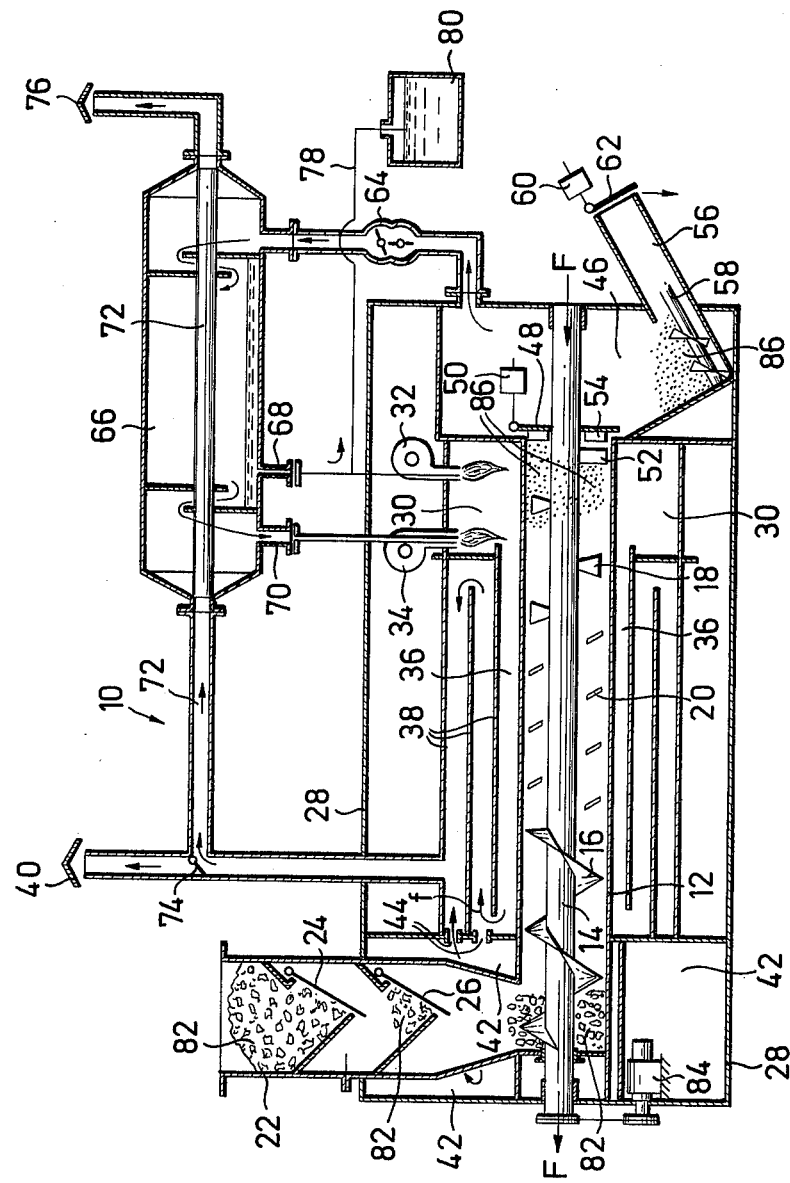

METHOD AND APPARATUS FOR THE PYROLYSIS OF WASTE PRODUCTS

BACKGROUND OF THE INVENTION

The invention relates to a method for the pyrolysis of waste products containing hydrocarbons, for example, old tyres or other vulcanized waste products of rubber or plastic, in which the waste products are decomposed into gases, oils, waxes, soot and/or carbon and apparatus for carrying out the method.

SUMMARY OF THE INVENTION

The present invention provides a method for the pyrolysis of waste products containing hydrocarbons, in which the waste products are decomposed into gases and/or oils and/or waxes and/or soot and/or carbon, comprising the steps of initially disintegrating the waste products into cuttings, drying the cuttings, heating the cuttings in a reactor vessel at a sub-atmospheric pressure up to a decomposition temperature by an external heat supply and maintaining them at that temperature whilst pushing them from an entrance to a delivery part of the reactor vessel, to thereby decompose the waste products, the gases released being sucked off in the same direction as the movement of the cuttings.

In the case of this method, the sub-atmospheric pressure is preferably maintained sufficiently low and the decomposition temperature maintained sufficiently high, that the oils and waxes released can be sucked off in the gaseous state together with the other gases from the remaining residual material for subsequent distillation, separation and purification.

In accordance with one advantageous development of the invention, the cuttings are turned over during the pushing process, and the cuttings during heating and decomposition process are advantageously kept compressed at a predetermined dynamic pressure, so that one rate of feed for optimal heat transmutation is ensured.

Furthermore, the waste products before pre-drying may be disintegrated into cuttings of a size from 30 to 50 mm, whilst the residual material remaining in the reactor tube is preferably further pulverized at the sub-atmospheric pressure before cooling.

The method can be carried out with special efficiency if the decomposition is carried out in an atmosphere which is kept substantially oxygen-free by exclusion of air, whilst the decomposition temperature is preferably between 400° C and 800° C.

Moreover, a pressure gradient of 30 to 40 mm water gauge is preferably maintained in the direction of movement of the cuttings so that the gases which occur in decomposition flow together in one direction and cannot flow back.

The invention also provides apparatus for carrying out the pyrolysis of waste products containing hydrocarbons in which the waste products are decomposed into gases and/or oils and/or waxes and/or soot and/or carbon comprising a reactor vessel, a driven feed device in the reactor vessel for driving waste products in the form of cuttings between an entrance and delivery end thereof, a heating device arranged coaxially around the reactor vessel for heating the waste material cuttings, a charging hopper which is at least partially heated and is equipped wth air tight closures, the hopper being connected airtightly to the reactor vessel at its entrance end, the reactor vessel at its delivery end connecting with a delivery chamber for receiving the decomposed products of the waste products, which delivery chamber is kept airtightly closed, and is separated from the reactor vessel by a delivery closure which is biassed to its closed position and the suction side of a blower being connected to the delivery chamber to remove the gaseous products.

Preferably the heating device comprises a heating chamber which extends annularly around the reactor vessel adjacent its delivery end and is provided with a burner which is connected to a chimney by a hot air passage in the form of an annular passage extending annularly around the reactor vessel from the heating chamber to the entrance end of the reactor vessel. The hot air passage may be arranged in labyrinthine manner by coaxial annular walls generally extending between the heating chamber and the charging hopper.

The feed device preferably comprises a rotatably mounted shaft which extends through the reactor vessel in its longitudinal direction and which over its circumference carries impeller means. The shaft may form a passage for hot air or alternatively, may form a combustion chamber with a burner therein.

The feed device may comprise a worm conveyor.

Adjacent the delivery end of the reactor vessel, at least one friction element may be mounted on the feed device to rotate therewith, a friction disc being mounted on the delivery closure to cooperate with the friction element to crush the residual material during delivery through the delivery closure. The delivery closure may comprise a flap loaded by a counter weight and is thereby biassed to the closed position with a predetermined force so that the material in the reactor vessel is under a dynamic pressure which brings about optimal filling of the reactor vessel.

In a particularly preferred arrangement the charging hopper has two air tight closures connected one after another to form an air lock. The lower part of the charging hopper is preferably mounted in the inside of an annular chamber for the purpose of pre-heating the waste products.

The delivery chamber may be connected via the blower to distillation vessel, means selectively connecting the heating chamber with the distillation vessel so that the outgoing gas which is led from the heating chamber into a chimney can be diverted into the distillation vessel for the purpose of temperature regulation thereof.

The heating device may include burners which burn the gases and/or oil obtained from the waste products, after separation and purification. The blower preferably produces in the reactor vessel a pressure gradient of the order of 30 to 40 mm water gauge in the direction of movement of the cuttings so that the gases which occur during decomposition flow together in the same direction as the movement of the cuttings and do not flow back into the charging hopper.

BRIEF DESCRIPTION OF THE DRAWING

The invention will be described in detail by way of example only and with reference to the accompanying drawing which shows in diagrammatic form apparatus for carrying out the process according to the invention.

DESCRIPTION OF THE PREFERRED EMBODIMENT

According to the drawing, the apparatus 10 comprises a reactor tube 12, which is arranged with its longitudinal axis horizontally aligned. In the reactor tube 12 there is rotatably mounted a shaft 14 which extends in the longitudinal direction of the tube 12. The shaft 14 can have over its circumference a continuous spiral vane 16 or obliquely arranged paddles 18. Instead of the rotatable shaft 14, a worm conveyor 20, which is not shown, can be arranged inside the reactor tube 12 which then moves parallel to the longitudinal direction of the reactor tube 12. The direction of rotation of the shaft 14 or the direction of movement of the conveyor (not represented) are so arranged that the material to be treated is forcibly fed from left to right (from an entrance end to a delivery end) in the reactor 12 — seen in the drawing.

A charging hopper 22 is connected airtightly to the reactor tube 12 at its entrance end. The charging hopper 22 is arranged vertically and extends with its longitudinal axis at right angles to the longitudinal axis of the reactor tube 12. Air exclusion doors 24 and 26 are provided connected in series on the inside of the charging hopper 22 to thereby for an air lock.

An annular jacket 28 extends coaxially around the reactor tube 12 from its entrance end to its delivery end and includes a heating device by which heat is conveyed to the inside of the reactor tube 12 through the wall thereof. The heating device includes a heating chamber 30 annularly surrounding the delivery end of the reactor tube 12 which chamber 30 is provided with burners 32 and 34. The heating chamber 30 has on its side closest the entrance end of the reactor tube 12 and closely surrounding the reactor tube 12 an annular aperture which passes into an annular hot air passage 36, which extends coaxially round the reactor tube 12 from the heating chamber 30 to adjacent the charging hopper 22. The hot air passage 36 is formed by several annular walls 38 which form a labyrinthine flow path for the hot outgoing air emerging from the heating chamber 30 and directs this hot air to a chimney 40.

A hot air chamber 42 surrounds the reactor tube 12 at its entrance end on that side of the hot air passage 36 which is remote from the heating chamber 30 and is in communication with the passage 36 by apertures 44, by which hot air can enter the hot air chamber 42. The charging hopper 22 is arranged with its lower part in the hot air chamber 42 on the inside of the annular jacket 28 and is thereby heated by the hot air which flows in it.

A delivery chamber 46 is airtightly connected to the reactor tube 12 at its delivery end. The delivery chamber 46 and the reactor tube 12 are separated from one another by a delivery flap 46 which is biassed into its closed position by a counter-weight 50 which acts upon a lever. A friction element 52 is fixedly mounted on the shaft 14 which is rotatably mounted in the reactor tube 12, adjacent the delivery flap 48. A friction disc 54, which extends annularly round the shaft 14 is firmly fixed to that side of the delivery flap which faces the interior of the reactor tube 12. The friction element 52 and the friction disc 54 cooperate when the shaft 14 is rotated to crush the residual material which is in the area of the delivery flap 48 and is pushed forward against the delivery flap 48, before this material can drop through the delivery flap 48 into the delivery chamber 46. The friction element 52 has a dimension which is suited to the inside diameter of the reactor tube 12, so that practically all of the residual material which is in the area of the delivery flap 48 is also crushed before it can drop out past the delivery flap 48.

The counter-weight 50 is so dimensioned in conjunction with its lever that the delivery flap 48 can only be opened by the pressure of material in the reactor tube 12 when the entire inner space of the reactor tube 12 and the charging hopper 22 are filled with cuttings or residual material and are sufficiently compressed for optimal filling so that the delivery flap thus produces a dynamic pressure within the reactor tube 12.

Adjacent the floor of the delivery chamber 46 a conveyor pipe 56 diagrammatically shown in the figure is provided with a conveyor device 58, in order to enable the pulverized residual material which drops into the delivery chamber 46 and which contains non-decomposable residual constituents, such as steel wires in the case of tyres, and residual coke or carbon, to be completely carried away. At the delivery end of the conveyor pipe 56 there is arranged a flap 62 biassed closed by a weight 60, which ensures an airtight closure of the delivery chamber 46 in the area of the conveyor pipe 56.

The suction side of a blower 64 is connected to the delivery chamber 46 and produces during operation a sub-atmospheric pressure therein, since it sucks off the gases released during decomposition and oils and waxes which are in the gaseous state from the inside of the reactor tube 12 through the delivery flap 48 and from the delivery chamber 46, whilst the entrance side of the reactor tube 12 is kept sealed by the air exclusion doors 24 and 26 in the charging hopper 22. The pressure side of the blower 64 is connected to a distillation vessel 66, through which the sucked off gases are conveyed and in which a fluid distillate and residual gases are separated, purified and cooled. The distillation vessel 66 is in communication with the burner 32 via an oil pipe 68, and via a gas pipe 70 with the burner 34. The burners 32,34 are consequently operated with combustible material which results from the decomposition of the waste products. It is only necessary for the starting operation to use combustible material from outside the process. Once, the apparatus 10 has been in operation combustibles which result from the decomposition can be stored for future starting operations.

A branch pipe 72 branches off from the chimney 40 the entrance to the pipe 72 being equipped with a control flap. The pipe 72 passes through the distillation vessel 66 to a second chimney 76. It is consequently possible by means of the control flap 74 to use the outgoing air for regulating the temperature in the distillation vessel 66.

The distillate which forms in the distillation vessel 66 and which is not consumed by the burner 32, after purification, is led via a branch pipeline 78 to a vessel 80 in which it is collected.

The apparatus 10 operates in the following manner.

The waste product is delivered in the form of cuttings 82 into the charging hopper 22 and drops through the upper air exclusion door 24 and then through the lower air exclusion door 26, and is then introduced into the reactor tube 12 on its entrance end.

Meanwhile, the shaft 14 is driven at pre-selected speed by a motor 84 whose speed and working interval can be regulated. The cuttings which drop into the reactor tube 12 are, as a result of the rotation of the shaft 14, forcibly pushed towards the delivery end at a pre-selected feed velocity and simultaneously heated by contact with the surface of the reactor tube 12 to a suitable decomposition temperature of 400° C to 800° C and kept at this decomposition temperature so that the cuttings decompose on their way to the delivery end of the reactor tube 12, the decomposition being completed before they reach the delivery end.

The delivery flap 48 holds back the cuttings or residual material 86 remaining after decomposition until the entire inside of the reactor tube 12 and the charging hopper 22 is filled and the material compressed to an optimum preselected rate of feed, and the force exerted by the dynamic pressure in the reactor tube 12 and charging hopper 22 on the delivery flap 48 overcomes the bias acting on the latter, so that the delivery flap 48 opens slightly and the residual materal which has remained after decomposition can drop out into the delivery chamber and the gas which results during decomposition can flow away.

When therefore the apparatus 10 is fully in operation, the entire inside of the reactor tube 12 and the charging hopper 22 are filled with cuttings 82 or residual material 86, but only some cuttings 82 in the area of the air doors 24 and 26 and the entry end of the reactor tube 12 and also some residual material 86 in the area of the delivery flap 48 and in the area of the conveyor device 58 are represented in the drawing for reasons of clarity.

The gases which occur in decomposition are led into the distillation vessel 66 and are treated and separated into gases and distillate therein. The resulting gases and the resulting distillate are at least partly re-fed to the burners 32 or 34 respectively in order to heat the reactor tube 12. The residual material dropping into the delivery chamber 46 is continuously delivered by means of the conveyor device 48 through the conveyor pipe 56 to the flap 62 which is loaded with a weight 60.

As the entire inside of the reactor tube 12 and the delivery chamber 46 is closed airtightly to the outside by the air exclusion doors 24 and 26 in the charging hopper 22 on the one hand, and the flap 62 on the conveyor pipe 56, on the other hand, and the gas cycle itself is air tightly closed by the distillation vessel 66, the pyrolysis takes place in the reactor tube 12 practically with complete exclusion of air, i.e. with an optimally small proportion of oxygen. Moreover, as the blower 64 also produces a sub-atmospheric pressure in the airtightly closed inside of the delivery chamber 46 and of the reactor tube 12, so that there is a pressure gradient of 30 to 40 mm water gauge, the gases occurring in decomposition flow in the same direction as the cuttings or residual material out of the reactor tube 12 and the delivery chamber 46 into the distillation chamber. The partial vacuum produced by the blower 64 also produces the further substantial effect that the oils and waxes produced during decomposition temperature can be kept in their gaseous state and can consequently easily be removed by suction.

The ratio between gas and distillate in the distillation vessel 66 can be adjusted by the temperature of the vessel 66, temperature control being achieved in a simple manner via the control flap 74 in the chimney 40.

The filling of the reactor tube 12, which is brought about by damming the cuttings 82 and the residual material 86 which are forcibly moved forward in the reactor tube 12 by the delivery flap 48 and the cuttings 82 loaded in the charging hopper 22, is essential for optimal heat transference from the inner surface of the reactor tube 12 to the cuttings and consequently for the efficiency of the entire apparatus. Heat transference is furthermore considerably improved by the forcible pushing forward and simultaneous turning over of the cuttings 82 in the reactor tube 12.

Dependent upon the size of the inside diameter of the reactor tube 12, it may be advantageous or even essential that heat is supplied to the cuttings 82, not only by the inner surface of the reactor tube 12 but also from the inside i.e. by the shaft 14. To this end, the shaft 14 can be hollow and either from a hot air passage connected to the heating chamber 30, or form a combustion chamber equipped with an individual burner. More suitably, the hot air current F is then led through the inside of the shaft 14 in a direction opposite to the direction of feed of the cuttings 82, as the greatest heat is desired in the area of the delivery flap 48, whereas a lower temperature exists at the entrance end of the reactor tube 12.

A further important feature of the apparatus 10 represented is that the cuttings 82 are pre-dried in the charging hopper 22 before they reach the inside of the reactor tube 12. The pre-heating takes place without a separate heat supply, as the outgoing air which is led away from the heating chamber 30 flows around the outside of the charging hopper 22.

There has thus been described a method and apparatus in which it is possible in a simple way with a compact and possibly mobile device to decompose waste products more especially old tyres, into constituents which are pure and can be re-used without any risk of polluting the environment.

We claim:

1. A method for carrying out the pyrolysis of waste products containing hydrocarbons comprising the steps of:

disintegrating the waste products into cuttings;
drying the cuttings;
driving the dried cuttings through a reactor vessel having an entrance end and a delivery end;
heating the cuttings as they are being driven from the entrance end to the delivery end of the reactor vessel to the decomposition temperature of the cuttings, said reactor vessel being maintained at a sub-atmospheric pressure, said reactor vessel further being maintained airtight and substantially free of oxygen;
damming the cuttings at the delvery end of the reactor vessel such that the entire reactor becomes filled with the cuttings, said uttings being kept compressed at a predetermined dynamic pressure; and
passing the decomposition gases and residue of undecomposed cuttings into a delivery chamber where said gases and residue are separately removed, said delivery chamber being maintained at sub-atmospheric pressure and substantially oxygen free by the exclusion of air.

2. A method as claimed in claim 1, in which the sub-atmospheric pressure is maintained sufficiently low and the decomposition temperature maintained sufficiently high so that oils and waxes released can be sucked off in the gaseous state.

3. A method as claimed in claim 1 in which the cuttings are turned over during the pushing process.

4. A method as claimed in claim 1 in which the waste products, before drying, are disintegrated into cuttings of a size from 30 to 50 mm.

5. A method as claimed in claim 1 in which the residual material remaining after decomposition is further pulverized at the sub-atmospheric pressure before cooling.

6. A method as claimed in claim 2 in which the decomposition temperature is between 400° C and 800° C.

7. Apparatus for carrying out the pyrolysis of waste products containing hydrocarbons comprising a reactor vessel having an entrance end and delivery end, a driven feed device provided in the reactor vessel for driving waste products in the form of cuttings between the entrance and delivery end thereof, a heating device arranged coaxially around the reactor vessel for heating the waste material cuttings, a charging hopper, which is at least partially heated, being connected airtightly to the reactor vessel at its entrance end, airtight closures of the hopper being provided, a delivery chamber connecting with the reactor vessel at its delivery end for receiving the decomposed products of the waste products, means for keeping the delvery chamber airtightly closed, a delivery closure separating the delivery chamber from the reactor tube means for biassing the delivery closure to its closed position and a blower, the suction side of which is connected to the delivery chamber to remove the gaseous products and maintain both the delivery chamber and reactor vessel at sub-atmospheric pressure.

8. Apparatus as claimed in claim 7 in which the heating device comprises a heating chamber which extends annularly around the reactor tube adjacent its delivery end, a burner being provided in the heating chamber, the apparatus further including a chimney, a hot air passage in the form of an annular passage extending annularly around the reactor vessel from the heating chamber to the entrance end of the reactor vessel, the heating chamber, hot air passage and chimney being serially interconnected.

9. Apparatus as claimed in claim 8 in which the hot air passage is arranged in labyrinthine manner by coaxial annular walls generally extending between the heating chamber and the charging hopper.

10. Apparatus as claimed in claim 7 in which the feed device comprises a rotatably mounted shaft means which extends through the reactor tube in its longitudinal direction and impeller means being provided over its circumference.

11. Apparatus as claimed in claim 10 in which the shaft means forms a passage for hot air.

12. Apparatus as claimed in claim 10 in which the shaft means forms a combustion chamber a burner being provided therein.

13. Apparatus as claimed in claim 10 in which the feed device comprises a worm conveyor.

14. Apparatus as claimed in claim 10 in which, adjacent the delivery end of the reactor vessel, at least one friction element is mounted on the feed device to rotate therewith, a friction disc being mounted on the delivery closure to cooperate with the friction element to crush the residual material during delivery through the delivery closure.

15. Apparatus as claimed in claim 7 in which the delivery closure comprises a flap loaded by a counterweight and is thereby biased to the closed position with a predetermined force.

16. Apparatus as claimed in claim 7 in which the charging hopper has two air tight closures connected one after another to form an air lock.

17. Apparatus as claimed in claim 16 in which at least the lower part of the charging hopper is mounted in the inside of an annular chamber for the purpose of preheating the waste products.

18. Apparatus as claimed in claim 8 in which the delivery chamber is connected via the blower to a distillation vessel, means selectively connecting the heating chamber with the distillation vessel so that the outgoing gas which is led from the heating chamber into the chimney can be diverted into the distillation vessel for the purpose of temperature regulation thereof.

19. Apparatus as claimed in claim 7 in which the heating device includes burners which burn the gases and/or oils obtained from the waste products, after separation and purification.

20. Apparatus as claimed in claim 8 in which the reactor tub is arranged with its longitudinal axis horizontal.

* * * * *